US009421866B2

(12) United States Patent
Madau et al.

(10) Patent No.: US 9,421,866 B2
(45) Date of Patent: Aug. 23, 2016

(54) VEHICLE SYSTEM AND METHOD FOR PROVIDING INFORMATION REGARDING AN EXTERNAL ITEM A DRIVER IS FOCUSING ON

(75) Inventors: Dinu Petre Madau, Canton, MI (US); Shadi Mere, Canton, MI (US); Paul Morris, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1135 days.

(21) Appl. No.: 13/241,904

(22) Filed: Sep. 23, 2011

(65) Prior Publication Data

US 2013/0076883 A1    Mar. 28, 2013

(51) Int. Cl.
*B60K 37/06* (2006.01)
*B60K 35/00* (2006.01)

(52) U.S. Cl.
CPC .............. *B60K 37/06* (2013.01); *B60K 35/00* (2013.01); *B60K 2350/1096* (2013.01); *B60K 2350/2052* (2013.01); *B60K 2350/962* (2013.01); *B60K 2350/965* (2013.01)

(58) Field of Classification Search
None
See application file for complete search history.

(56) References Cited

U.S. PATENT DOCUMENTS

| | | | |
|---|---|---|---|
| 6,823,084 B2 | 11/2004 | Myers et al. | |
| 7,031,553 B2 | 4/2006 | Myers et al. | |
| 7,171,046 B2 | 1/2007 | Myers et al. | |
| 7,333,676 B2 | 2/2008 | Myers et al. | |
| 7,386,437 B2 * | 6/2008 | Brulle-Drews | 704/3 |
| 7,620,268 B2 | 11/2009 | Myers et al. | |
| 7,640,104 B2 | 12/2009 | Ramaswamy et al. | |
| 7,738,706 B2 | 6/2010 | Aradhye et al. | |
| 7,817,855 B2 | 10/2010 | Yuille et al. | |
| 2003/0202683 A1 | 10/2003 | Ma et al. | |
| 2005/0065721 A1 | 3/2005 | Herrtwich et al. | |
| 2006/0187305 A1* | 8/2006 | Trivedi | G06K 9/00234 348/169 |
| 2008/0262714 A1 | 10/2008 | Abramovich Ettinger | |
| 2008/0262717 A1 | 10/2008 | Ettinger | |
| 2010/0226535 A1* | 9/2010 | Kimchi et al. | 382/103 |
| 2011/0091098 A1 | 4/2011 | Yuille et al. | |

* cited by examiner

*Primary Examiner* — Geepy Pe
(74) *Attorney, Agent, or Firm* — Klintworth & Rozenblat IP LLC

(57) ABSTRACT

A system and method for providing information to a driver of a vehicle includes: an image-capture device; a head or eye-gaze tracker; at least one processor; and an output device. The image-capture device captures an image of an environment external to a vehicle. The head or eye-gaze tracker determines an item a driver of the vehicle is viewing. The at least one processor processes the captured image. The at least one processor also translates language contained in the captured image of the item the driver is viewing to a second language, or determines point-of-interest information based on the captured image of the item the driver is viewing. The output device outputs information containing the second translated language of the captured image of the item the driver is viewing, or containing the determined point-of-interest information based on the captured image of the item the driver is viewing.

28 Claims, 3 Drawing Sheets

US 9,421,866 B2

VEHICLE SYSTEM AND METHOD FOR PROVIDING INFORMATION REGARDING AN EXTERNAL ITEM A DRIVER IS FOCUSING ON

FIELD OF THE DISCLOSURE

The disclosure relates to systems and methods for providing a driver of a vehicle with language translation information or point-of-interest information regarding an item external to the vehicle which the driver is focusing on.

BACKGROUND OF THE DISCLOSURE

A driver of a vehicle often focuses on an item external to the vehicle, such as a sign, road-sign, or other type of item, upon which the driver desires additional information. Many vehicles contain navigation systems which are cumbersome to use in order to obtain additional information regarding the item the driver is viewing. For instance, the driver of the vehicle may focus on a road sign which the driver desires additional point-of-interest information regarding, and then have to enter the type of point-of-interest information the driver desires into the navigation system. By the time the driver enters this information into the system, the driver may have already missed the exit.

When traveling in a foreign country, the road-sign upon which the driver is focusing will likely be in a foreign language that the driver is unable to comprehend. This can make driving in a foreign country hazardous. Many of the existing systems for translating language are not adapted to hone in on only the item that the driver is focusing on. As a result, the driver has to tell the system what language the driver desires to be translated. This is inefficient and can be a safety concern.

A system and method for providing information to a driver of a vehicle is needed to resolve one or more issues of the existing systems and methods.

SUMMARY OF THE DISCLOSURE

In one embodiment, a system for providing information to a driver of a vehicle is disclosed. The system comprises: an image-capture device; a head or eye-gaze tracker; at least one processor; and an output device. The image-capture device is for capturing an image of an environment external to a vehicle. The head or eye-gaze tracker is for determining an item a driver of the vehicle is viewing. The at least one processor is for processing the captured image and at least one of: (1) translating language contained in the captured image of the item the driver is viewing to a second language; or (2) determining point-of-interest information based on the captured image of the item the driver is viewing. The output device is for outputting information comprising at least one of: (1) the second language comprising the translated language of the captured image of the item the driver is viewing; or (2) the determined point-of-interest information based on the captured image of the item the driver is viewing.

In another embodiment, a method is disclosed for providing information to a driver of a vehicle. In one step, an image of an environment external to a vehicle is captured with an image capture device. In another step, a head or eye-gaze tracker is used to determine an item a driver of the vehicle is viewing. In still another step, at least one processor processes the captured image and at least one of: (1) translates language contained in the captured image of the item the driver is viewing to a second language; or (2) determines point-of-interest information based on the captured image of the item the driver is viewing. In an additional step, an output device outputs information comprising at least one of: (1) the second language comprising the translated language of the captured image of the item the driver is viewing; or (2) the determined point-of-interest information based on the captured image of the item the driver is viewing.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims. It is noted that the Figures are purely for illustrative purposes and are not to scale.

Figure 1:
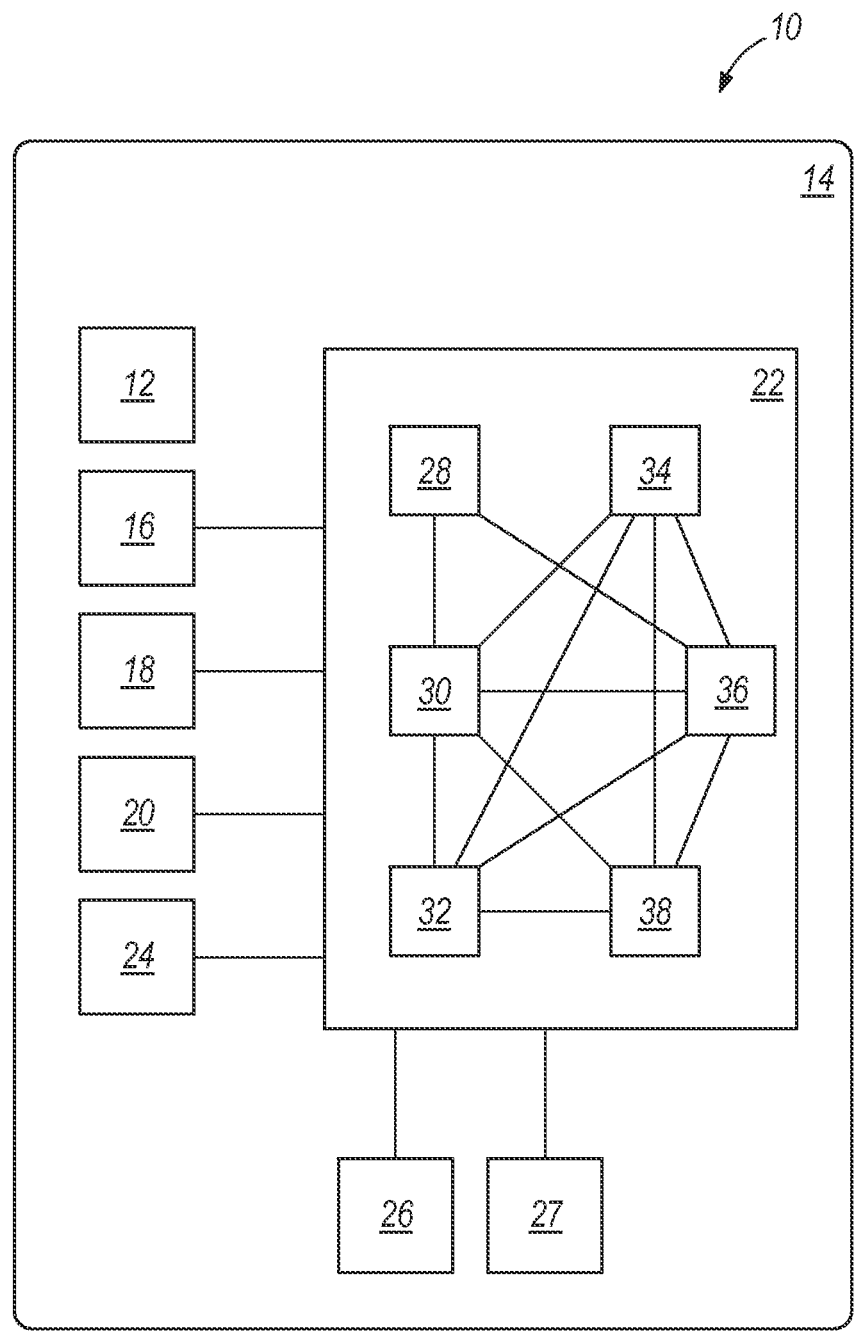
FIG. 1 illustrates a block diagram of a system for providing information to a driver of a vehicle.

FIG. 1 illustrates a block diagram of a system 10 for providing information to a driver 12 of a vehicle 14. The system 10 comprises: an input device 16; an image capture device 18; a tracker device 20; a processor 22; a communication device 24; an output device 26; and a navigation system 27. The system 10 is installed in the vehicle. All of the above-referenced components of the system 10 are in wired or wireless communication with one another.

The input device 16 comprises one or more input devices which allow the driver to input information into the system 10 or control the system 10. Exemplary input devices 16 comprise a microphone, a control panel, or other type of input device which allows the driver to input information into the system 10. The driver 12 may speak a command into a microphone to direct the system 10. The driver 12 may type, touch, or visually input a command using a control panel to direct the system 10. In other embodiments, the driver 12 may input commands using a variety of methods and input devices 16.

The image capture device 18 comprises one or more image capture devices for capturing an image of the environment external to the vehicle 14. The captured image may contain a sign, a road-sign, or another type of item in the environment external to the vehicle 14. In one embodiment, the image capture device 18 indiscriminately captures an image of the environment external to the vehicle 14 without input from the tracker device 20 to determine what portion of the environment external to the vehicle 14 the driver 12 is focusing on. In another embodiment, the image capture device 18 captures only the precise image of the portion of the environment external to the vehicle 14 which the driver 12 is focusing on, based on input from the tracker device 20, without capturing in the image the portions of the environment external to the vehicle 14 which the driver 12 is not focusing on. The captured image may contain a sign, a road-sign, or another type of item in the environment external to the vehicle which the driver 12 of the vehicle 14 is focusing on.

Exemplary image capture devices 18 comprise a camera, a video device, or another type of image capture device for capturing an image of the environment external to the vehicle 14. The image capture device 18 may be located anywhere around the vehicle 14 to capture the desired image of the environment external to the vehicle 14 such as a forward-looking image capture device, a side-looking image capture device, a rear-looking image capture device, or another type of image capture device. The captured images may be in digital or analog form. If the captured images are digital, the image capture device 18 or the processor 22 may further comprise an analog-to-digital converter for converting the images to digital images. In one embodiment, the image capture device 18 may continuously take images of the environment external to the vehicle 14. In another embodiment, the image capture device 18 may only take images of the environment external to the vehicle 14 when the driver 12 of the vehicle 14 directs the system 10 to do so using the input device 16. This leads to efficiencies in the processing and data storage of the system 10.

The tracker device 20 comprises one or more tracker devices for determining what portion of the environment external to the vehicle 14 the driver 12 is focusing on. This may comprise a sign, a road-sign, or another item external to the vehicle 14 which the driver 12 is focusing on. Exemplary tracker devices 20 comprise an eye-gaze tracker for tracking the eye movements of the driver 12, a head tracker for tracking the head movements of the driver 12, or another type of tracker device for tracking what portion of the environment external to the vehicle 14 the driver 12 is focusing on. Exemplary tracker devices 20 may comprise a camera for taking an image of the driver's eyes or head, a light emitting and light detecting system for tracking the driver's eyes or head, and a processor implementing a tracking algorithm to process, determine, save, and track the locations of the driver's eyes or head based on data received from the infrared camera, based on the images taken by the camera, and based on a location coordinate unit which assists in determining the coordinates of the driver's head or eyes. Exemplary tracker devices 20 include all tracker devices made by Smarteye Corporation referred to at http://www.smarteyecorporation.com which is hereby incorporated by reference. U.S. Pat. Nos. 6,578,962 and 6,758,563, hereby incorporated by reference, describe additional exemplary tracker devices 20 which may be used by the system 10. Moreover, other tracker devices such as those described at http://en.wikipedia.org/wiki/Eye_tracking may also be used by the system and are also incorporated by reference. In other embodiments, varying tracker devices 20 may be utilized to determine what portion of the environment external to the vehicle 14 the driver 12 is focusing on.

The processor 22 comprises one or more processors for processing the captured image. The processor 22 may include one or more computers. In one embodiment the processor 22 processes the indiscriminately captured image, captured by the image capture device 18, of the environment external to the vehicle 14 to narrow the indiscriminately captured image, using the tracker device 20, to only the portion of the image which the driver 12 of the vehicle 14 was focusing on while excluding portions of the image which the driver 12 was not focusing on. In another embodiment, the processor 22 processes what portion of the environment external to the vehicle 14 the driver 12 is focusing on using data received from the tracker device 20 and then directs the image capture device 18 to only capture an image of the portion of the environment external to the vehicle 14 which the driver 12 is focusing on without capturing items in the image which the driver 12 is not focusing on. In one embodiment, the processor 22 is configured to translate language contained in the captured image to a second language. For instance, the processor 22 may translate language contained in the captured image of a sign, road-sign, or other item the driver 12 of the vehicle 14 was viewing to a second language. In another embodiment, the processor 22 is configured to determine point-of-interest information based on the captured image. For instance, the processor 22 may determine point-of-interest information based on the captured image of a sign, road-sign, or other item the driver 12 of the vehicle 14 was viewing. The point-of-interest information may comprise a location of a point-of-interest, a name of a point-of-interest, a distance the vehicle 14 is away from a point-of-interest, a type of place, product, or service located at a point-of-interest, or other type of point-of-interest information.

The processor 22 comprises a location determination unit 28, a processing unit 30, a pattern recognition unit 32, a translation unit 34, a database unit 36, and a speech unit 38. In other embodiments, the processor 22 may not contain one or more of the above-referenced units, or the processor 22 may contain additional types of units. The referenced units of the processor may be contained within the processor 22. In other embodiments, one or more of the referenced units of the processor 22 may be contained externally to the processor 22 but in wired or wireless communication with the processor 22.

The location determination unit 28 comprises one or more location determination units for determining a location, direction, or speed of the vehicle 14, and/or for determining a location of an item external to the vehicle 14 which the driver 12 is focusing on contained in the captured image such as a sign, a road-sign, or other type of item which the driver 12 of the vehicle 14 is focusing on. The location determination unit 28 determines the location of the vehicle 14 relative to the item contained in the captured image which the driver 12 of the vehicle 14 is focusing on. Exemplary location determination units 28 comprise a Global Positioning System, a compass, a speedometer, an accelerometer, a gyrometer, or another type of location determination unit for determining a location, direction, or speed of the vehicle 14, and/or for determining a location of an item contained in the captured image which the driver 12 of the vehicle 14 is focusing on.

The processing unit 30 comprises one or more processing units for processing the information gathered by the system 10 including the captured image. The processing unit 30 carries out the instructions of a processor program saved in memory of the processor 22 to perform the arithmetical, logical, or input/output operations of the system 10.

The pattern recognition unit 32 comprises one or more pattern recognition units for recognizing and determining a pattern. The pattern recognition unit 32 may recognize a pattern in the captured image. The pattern recognition unit 32 may recognize a pattern comprising an item such as a sign, road-sign, or other type of item that the driver 12 of the vehicle 14 is viewing. The pattern recognition unit 32 may also recognize a pattern comprising a character, a symbol, a number, a language, or another type of pattern which the driver 12 of the vehicle 14 is viewing.

The translation unit 34 comprises one or more translation units for translating the pattern in the item the driver 12 of the vehicle 14 is viewing from one language into a second language. The translation unit 34 does this by analyzing the pattern in the captured image of the item the driver 12 of the vehicle 14 is viewing. For instance, in one embodiment the translation unit 34 may translate language contained in a captured image of a sign, road-sign, or another item the driver 12 of the vehicle 14 is viewing into a second language. The translation unit 34 may be configured to automatically determine the language of the pattern contained in the captured image based on a determined location of the item the driver 12 of the vehicle 14 is viewing. In another embodiment, the translation unit 34 may process the pattern contained in the captured image to determine what language it is in. The translation unit 34 may be configured to automatically translate the pattern contained in the captured image into the second language of the driver 12 of the vehicle 14. In other embodiments, the driver 12 of the vehicle 14 may input into the system 10, using the input device 16, what language the pattern of the image is in, and/or may input into the system 10 what the second language of the driver 12 of the vehicle 14 is.

The database unit 36 comprises one or more database units for receiving, storing, or transmitting data to the system 10. The database unit 36 may comprise a database for storing the captured image of the item the driver 12 of the vehicle 14 is viewing. The database unit 36 may comprise a database for pattern recognition to support the pattern recognition unit 31 in order to determine the pattern of the captured image. The database unit 36 may comprise a point-of-interest database containing points-of-interest for the captured image. The database unit 36 may comprise a speech recognition database for recognizing speech of the driver 12 of the vehicle 14.

The speech unit 38 comprises one or more speech units for converting text to speech or for converting speech to text. The speech unit 38 may convert the translated or non-translated pattern of the captured image to speech. The speech unit 38 may also convert the speech of the driver 12 of the vehicle 14, inputted into the system 10 through the input device 16, to text.

The communication device 24 comprises one or more communication devices for communicating with devices external to the vehicle 14 in order for the system 10 or the processor 22 to send or receive information. The communication device 24 may communicate with external devices outside of the vehicle 14 such as the internet, a satellite, an external communication or information system for communicating, providing, or receiving information to or from the system 10 or the processor 22, an external database comprising information which the system 10 or processor 22 accesses or downloads, or another type of external device. The communication device 24 may utilize any type of signal for communication purposes.

The output device 26 comprises one or more output devices for outputting information to the driver 12 of the vehicle 14. In one embodiment, the outputted information comprises the translated language of the captured image. In another embodiment, the outputted information comprises the determined point-of-interest information based on the captured image. The output device 26 may comprise a visual display for visually displaying the outputted information to the driver 12 of the vehicle 14. The output device 26 may further comprise an audio device, such as a speaker, for audio-outputting the outputted information to the driver 12 of the vehicle 14.

The navigation system 27 comprises one or more navigation systems for providing navigation information to the driver 12 of the vehicle 14 for assisting the driver 12 to navigate the vehicle 14. The navigation system 27 may comprise a portion of the processor 22, or be external to the processor 22 but in wired or wireless communication with the processor 22. The navigation system 27 may assist the driver 12 in navigating the vehicle 14 to a location based on translated second language outputted by the system 10. The navigation system 27 may also assist the driver 12 in navigating the vehicle 14 to a point-of-interest identified by the system 10. The navigation system 27 may provide video or audio instructions to the driver 12 of the vehicle 14 using any component of the system 10. The navigation system 27 may comprise a Global-Positioning-System or other type of navigation system for directing the driver 12 of the vehicle 14 to a location.

Figure 2:
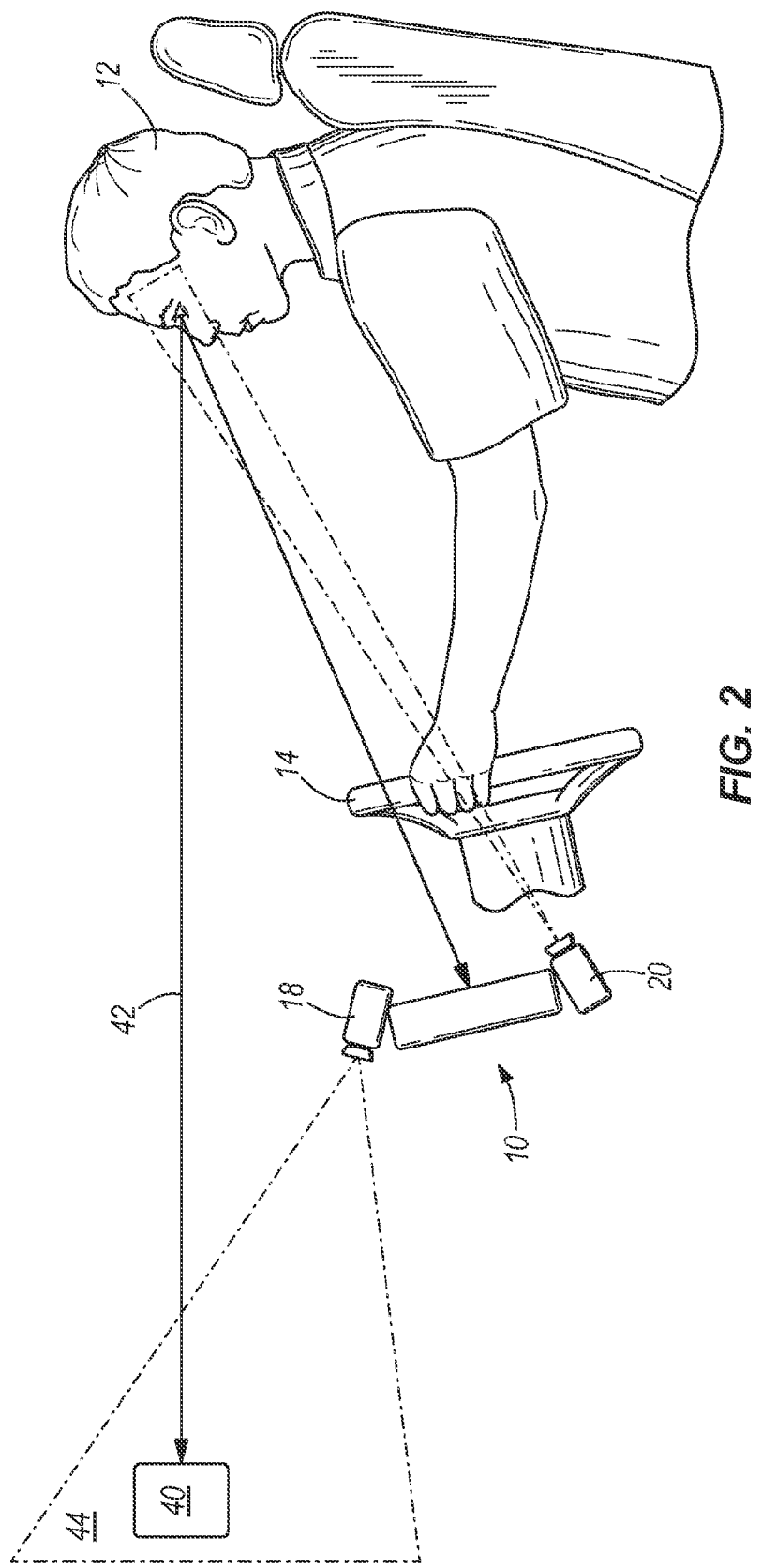
FIG. 2 illustrates a side view of one embodiment of a driver driving a vehicle utilizing the system of FIG. 1.

FIG. 2 illustrates a side view of one embodiment of a driver 12 driving a vehicle 14 utilizing the system 10 of FIG. 1. The tracker device 20 is tracking the driver's focal point to determine what item 40, external to the vehicle 14, in the driver's line of sight 42 the driver 12 is focusing on. The image capture device 18 is indiscriminately capturing an image of the environment 44 external to the vehicle 14 including capturing the item 40 which the driver 12 is focusing on. The system 10 is processing the captured image and cutting down the captured image to only the item 40 which the driver 12 is focusing on. The system 10 is determining where the item 40 is located relative to the vehicle 14. The system 10 is recognizing a pattern in the cut-down captured image. The system 10 is either: (1) translating language contained in the recognized pattern to a second language; or (2) determining point-of-interest information based on the recognized pattern. The system 10 is outputting to the driver 12, visually or through audio, either: (1) the translated second language of the recognized pattern; or (2) the determined point-of-interest information based on the recognized pattern.

Figure 3:
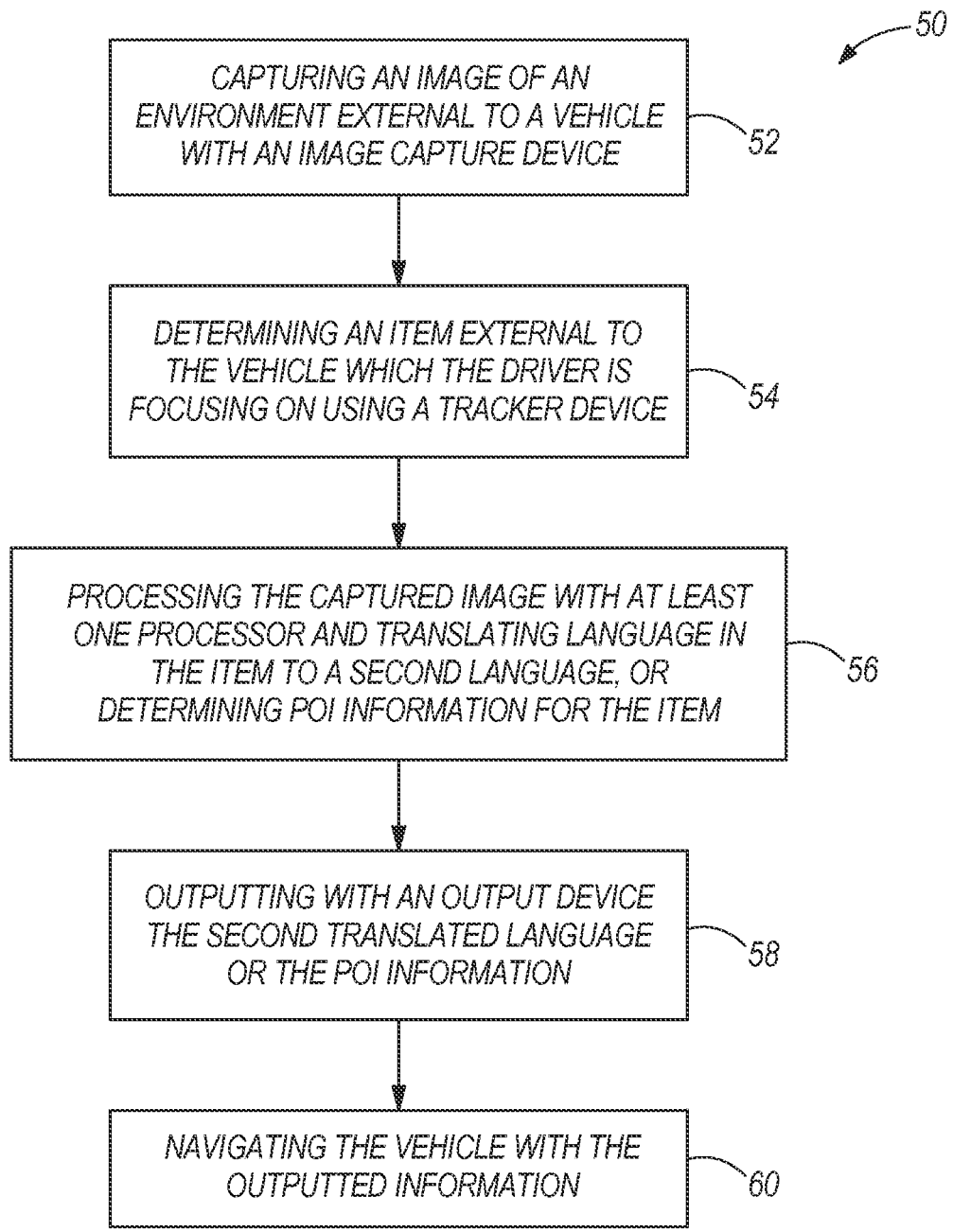
FIG. 3 illustrates a flowchart of one embodiment of a method for providing information to a driver of a vehicle.

FIG. 3 illustrates a flowchart of one embodiment of a method 50 for providing information to a driver of a vehicle. In step 52, an image capture device captures an image of an environment external to a vehicle. The captured image includes an item the driver of the vehicle is viewing or focusing on. This item may comprise a sign, a road-sign, or another type of item external to the vehicle. In one embodiment, during step 52 the image capture device indiscriminately captures the image of the environment external to the vehicle.

In step 54, a tracker device determines the item external to the vehicle which the driver is viewing or focusing on. In another embodiment, step 54 takes place prior to step 52 and the image capture device captures an image of only the item of the environment external to the vehicle that the driver is viewing or focusing on by processing data received from the tracker device without capturing portions of the environment that the driver is not viewing or focusing on.

In step 56, at least one processor processes the captured image and at least one of: (1) translates language contained in the captured image of the item the driver is viewing to a second language; or (2) determines point-of-interest information based on the captured image of the item the driver is viewing. The point-of-interest information may comprise a location of a point-of-interest, a name of a point-of-interest, a distance the vehicle is away from a point-of-interest, a type of place, product, or service located at a point-of-interest, or other type of point-of-interest information. Step 56 may include recognizing the item in the captured image that the driver of the vehicle is viewing using a pattern recognition unit. Step 56 may further include determining, using a location determination unit such as a Global Positioning system or other type of location determination unit, at least one of a location of the item in the captured image or a location of the vehicle. In one embodiment, during step 56 the at least one processor narrows down the captured image to only the item which the driver is viewing or focusing on and excludes other portions of the captured image. In another embodiment, when the method arrives at step 56 the captured image is already narrowed down to only the item which the driver is viewing or focusing on due to the image capture device initially capturing an image of only the item of the environment external to the vehicle that the driver is viewing or focusing on by processing data received from the tracker device.

In step 58, an output device outputs at least one of: (1) the second language comprising the translated language of the captured image of the item the driver is viewing; or (2) the determined point-of-interest information based on the captured image of the item the driver is viewing. Step 58 may comprise the output device outputting the information on a visual display, or outputting the information using an audio device. In step 60, a navigation system is used to navigate the vehicle. Step 60 may comprise the navigation system navigating the vehicle based on the outputted information.

One or more embodiments of the disclosure may overcome one or more issues of the existing art by automatically honing in on an item external to a vehicle which a driver is focusing on, and automatically outputting to the driver translated language of the item or point-of-interest information regarding the item. This may result in making driving a vehicle easier with corresponding advantages in time and safety.

It should be understood, of course, that the foregoing relates to exemplary embodiments of the disclosure and that modifications may be made without departing from the spirit and scope of the disclosure as set forth in the following claims.

We claim:

1. A system for providing information to a driver of a vehicle comprising:
   a vehicle comprising an image-capture device, a head or eye-gaze tracker, at least one processor, and an output device;
   the head or eye-gaze tracker to determine an area a driver of the vehicle is viewing;
   the image-capture device to capture only the area the driver of the vehicle is viewing based on data from the head or eye-gaze tracker;
   the at least one processor programmed to control the head or eye-gaze tracker and the image-capture device, to process the captured area, and at least one of: (1) translate language contained in the captured area the driver is viewing to a second language; or (2) determine point-of-interest information based on the captured area the driver is viewing; and
   the output device to output information comprising at least one of: (1) the second language comprising the translated language of the captured area the driver is viewing; or (2) the determined point-of-interest information based on the captured area the driver is viewing.

2. The system of claim 1 wherein the at least one processor is programmed to process the captured area and to translate the language contained in the captured area the driver is viewing to the second language, and the output device is to output the second language comprising the translated language of the captured area the driver is viewing.

3. The system of claim 1 wherein the at least one processor is programmed to process the captured area and to determine the point-of-interest information based on the captured area the driver is viewing, and the output device is to output the determined point-of-interest information based on the captured area the driver is viewing.

4. The system of claim 3 wherein the point-of-interest information comprises at least one of a location of the point-of-interest, the name of the point-of-interest, a distance the vehicle is away from the point-of-interest, or a type of place, product, or service located at the point-of-interest.

5. The system of claim 1 wherein the vehicle further comprises a location determination unit to determine at least one of a location of the area or a location of the vehicle.

6. The system of claim 5 wherein the location determination unit comprises a Global-Positioning-System.

7. The system of claim 1 wherein the vehicle further comprises a pattern recognition unit to recognize the area the driver of the vehicle is viewing.

8. The system of claim 1 wherein the output device comprises a display to visually display the outputted information.

9. The system of claim 1 wherein the output device comprises an audio device to audio-output the outputted information.

10. The system of claim 1 wherein the vehicle further comprises a navigation system to assist the driver in navigating the vehicle.

11. A method for providing information to a driver of a vehicle comprising:
    determining with a head or eye-gaze tracker of the vehicle an area a driver of the vehicle is viewing;
    capturing only the area the driver is viewing with an image capture device of the vehicle;
    processing the captured area with at least one processor of the vehicle and at least one of: (1) translating language contained in the captured area the driver is viewing to a second language; or (2) determining point-of-interest information based on the captured area the driver is viewing; and
    outputting, with an output device of the vehicle, information comprising at least one of: (1) the second language comprising the translated language of the captured area the driver is viewing; or (2) the determined point-of-interest information based on the captured area the driver is viewing.

12. The method of claim 11 wherein the processing step comprises the at least one processor processing the captured area and translating the language contained in the captured area the driver is viewing to the second language, and the outputting step comprises the output device outputting the second language comprising the translated language of the captured area the driver is viewing.

13. The method of claim 11 wherein the processing step comprises the at least one processor processing the captured area and determining the point-of-interest information based on the captured area the driver is viewing, and the outputting step comprises the output device outputting the determined point-of-interest information based on the captured area the driver is viewing.

14. The method of claim 13 wherein the point-of-interest information comprises at least one of a location of the point-of-interest, the name of the point-of-interest, a distance the vehicle is away from the point-of-interest, or a type of place, product, or service located at the point-of-interest.

15. The method of claim 11 further comprising determining, using a location determination unit of the vehicle, at least one of a location of the area or a location of the vehicle.

16. The method of claim 15 wherein the location determination unit comprises a Global-Positioning-System.

17. The method of claim 11 further comprising recognizing the area the driver of the vehicle is viewing using a pattern recognition unit of the vehicle.

18. The method of claim 11 wherein the output device comprises a display, and the outputting comprises visually displaying the outputted information on the display.

19. The method of claim 11 wherein the output device comprises an audio device, and the outputting comprises audio-outputting the outputted information using the audio device.

20. The method of claim 11 further comprising using a navigation system of the vehicle to navigate the vehicle.

21. The system of claim 1 wherein the vehicle further comprises a navigation system, wherein the at least one processor is programmed to process the captured area and to translate the language contained in the captured area the driver is viewing to the second language, the output device is to output the second language comprising the translated language of the captured area the driver is viewing, and the navigation system is to direct the driver to a location based on the second language comprising the translated language of the captured area.

22. The system of claim 3 wherein the point-of-interest information comprises a distance the vehicle is away from the point-of-interest.

23. The system of claim 3 wherein the point-of-interest information comprises directions for the vehicle to follow to arrive at the point-of-interest.

24. The system of claim 23 wherein the vehicle further comprises a navigation system, wherein the navigation system is to direct the driver to the point-of-interest using the directions.

25. The method of claim 11 wherein the processing step comprises the at least one processor processing the captured area and translating the language contained in the captured area the driver is viewing to the second language, the outputting step comprises the output device outputting the second language comprising the translated language of the captured area the driver is viewing, and additionally including the step of a navigation system of the vehicle directing the driver to a location based on the second language comprising the translated language of the captured area.

26. The method of claim 13 wherein the point-of-interest information comprises a distance the vehicle is away from the point-of-interest.

27. The method of claim 13 wherein the point-of-interest information comprises directions for the vehicle to follow to arrive at the point-of-interest.

28. The method of claim 27 further comprising a navigation system of the vehicle directing the driver to the point-of-interest using the directions.

* * * * *